US009503587B2

(12) United States Patent
Naruse

(10) Patent No.: US 9,503,587 B2
(45) Date of Patent: Nov. 22, 2016

(54) INFORMATION PROCESSING APPARATUS, CONTROL METHOD OF INFORMATION PROCESSING APPARATUS, AND STORAGE MEDIUM STORING PROGRAM

(71) Applicant: CANON KABUSHIKI KAISHA, Tokyo (JP)

(72) Inventor: Taketomo Naruse, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/744,237

(22) Filed: Jun. 19, 2015

(65) Prior Publication Data
US 2015/0288832 A1 Oct. 8, 2015

Related U.S. Application Data

(63) Continuation of application No. 13/777,446, filed on Feb. 26, 2013, now Pat. No. 9,094,780.

(30) Foreign Application Priority Data

Mar. 5, 2012 (JP) ................. 2012-048620

(51) Int. Cl.
*H04W 76/00* (2009.01)
*H04N 1/00* (2006.01)
(Continued)

(52) U.S. Cl.
CPC ........ *H04N 1/00108* (2013.01); *G06F 3/1204* (2013.01); *G06F 3/126* (2013.01); *G06F 3/1236* (2013.01); *G06F 3/1292* (2013.01);
(Continued)

(58) Field of Classification Search
USPC ...... 455/41.1, 41.2, 509, 412.1, 426.1, 41.3, 455/517, 456, 15, 25
See application file for complete search history.

(56) References Cited

U.S. PATENT DOCUMENTS

| 8,005,423 | B2 * | 8/2011 | Sumita ................. | H04B 7/2606 340/7.46 |
| 2008/0079573 | A1 * | 4/2008 | Bloebaum ......... | G06F 17/30876 340/568.1 |

(Continued)

FOREIGN PATENT DOCUMENTS

CN 101520949 9/2009
CN 101933246 12/2010
(Continued)

OTHER PUBLICATIONS

JP Office Action—JP Application No. 2012-048620 dated Jan. 18, 2016.

*Primary Examiner* — Ganiyu A Hanidu
(74) *Attorney, Agent, or Firm* — Fitzpatrick, Cella, Harper & Scinto

(57) ABSTRACT

In an information processing apparatus capable of executing a first wireless communication method and a second wireless communication method having a communication range wider than that of the first wireless communication method, an apparatus to be caused to execute predetermined processing is searched for using both the first wireless communication method and the second wireless communication method. When a common apparatus has been found by both the first wireless communication method and the second wireless communication method, the common apparatus is decided as the apparatus to be caused to execute the predetermined processing by the second wireless communication method.

30 Claims, 14 Drawing Sheets

(51) Int. Cl.
  *H04W 4/00* (2009.01)
  *H04B 7/26* (2006.01)
  *H04W 76/02* (2009.01)
  *G06F 3/12* (2006.01)
  *H04W 8/00* (2009.01)
  *H04L 29/08* (2006.01)
  *H04W 88/06* (2009.01)
  *H04W 84/12* (2009.01)

(52) U.S. Cl.
  CPC ........ *H04B7/2606* (2013.01); *H04N 1/00408* (2013.01); *H04W 4/008* (2013.01); *H04W 8/005* (2013.01); *H04W 76/023* (2013.01); *G06F 3/1232* (2013.01); *H04L 67/16* (2013.01); *H04N 2201/006* (2013.01); *H04N 2201/0039* (2013.01); *H04N 2201/0043* (2013.01); *H04N 2201/0094* (2013.01); *H04N 2201/0096* (2013.01); *H04W 84/12* (2013.01); *H04W 88/06* (2013.01)

(56) References Cited

U.S. PATENT DOCUMENTS

| | | | |
|---|---|---|---|
| 2009/0191811 A1 | 7/2009 | Griffin et al. | 455/41.1 |
| 2010/0130240 A1* | 5/2010 | Hart | H04W 8/005 455/509 |
| 2011/0162048 A1* | 6/2011 | Bilbrey | H04W 8/005 726/4 |
| 2011/0244795 A1 | 10/2011 | Sueyoshi et al. | 455/41.1 |
| 2012/0052806 A1* | 3/2012 | Takayama | H04L 63/045 455/41.2 |
| 2012/0309309 A1* | 12/2012 | Cho | H04W 76/023 455/41.1 |
| 2013/0229673 A1 | 9/2013 | Nakayama et al. | 358/1.13 |
| 2013/0229685 A1 | 9/2013 | Naruse | 358/1.15 |

FOREIGN PATENT DOCUMENTS

| | | | |
|---|---|---|---|
| CN | 102208922 | 10/2011 | |
| JP | 2007-166538 | 6/2007 | ............ H04B 7/26 |
| JP | 2011-155593 | 8/2011 | ............ H04M 1/00 |

* cited by examiner

OUTSIDE DRAWING OF MFP

PLAN VIEW OF MFP

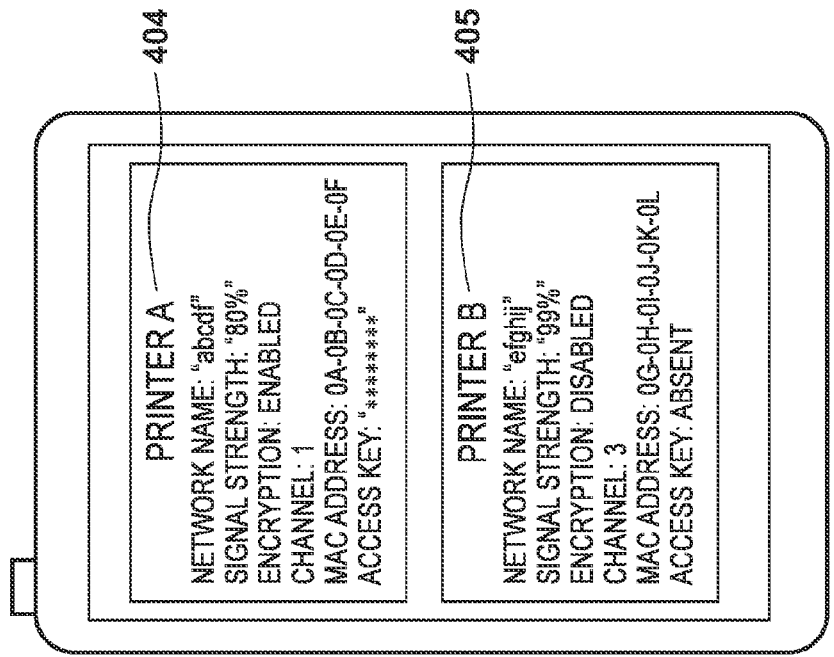
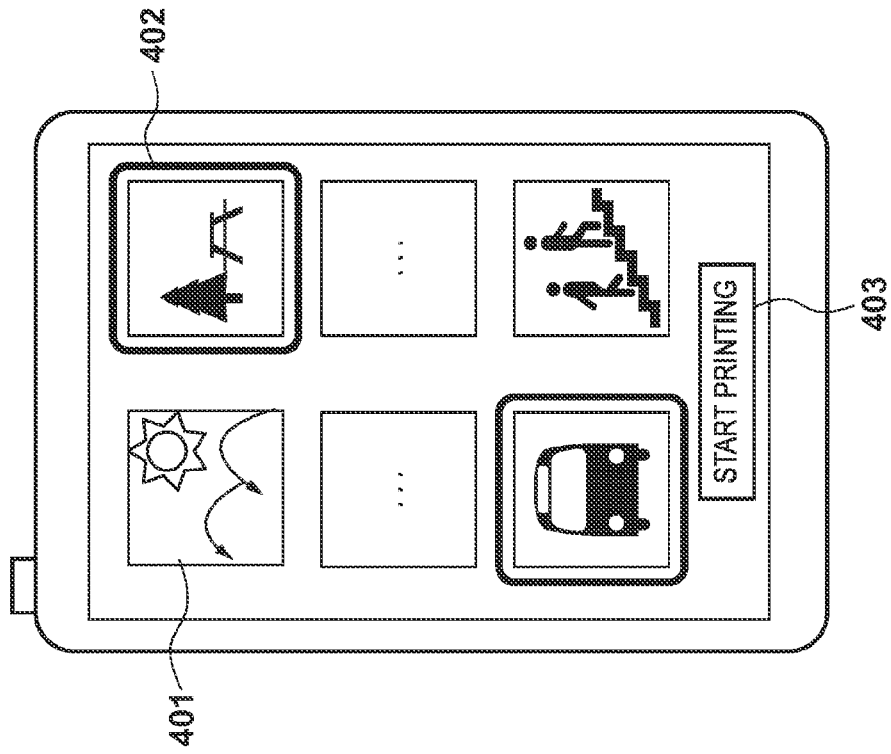

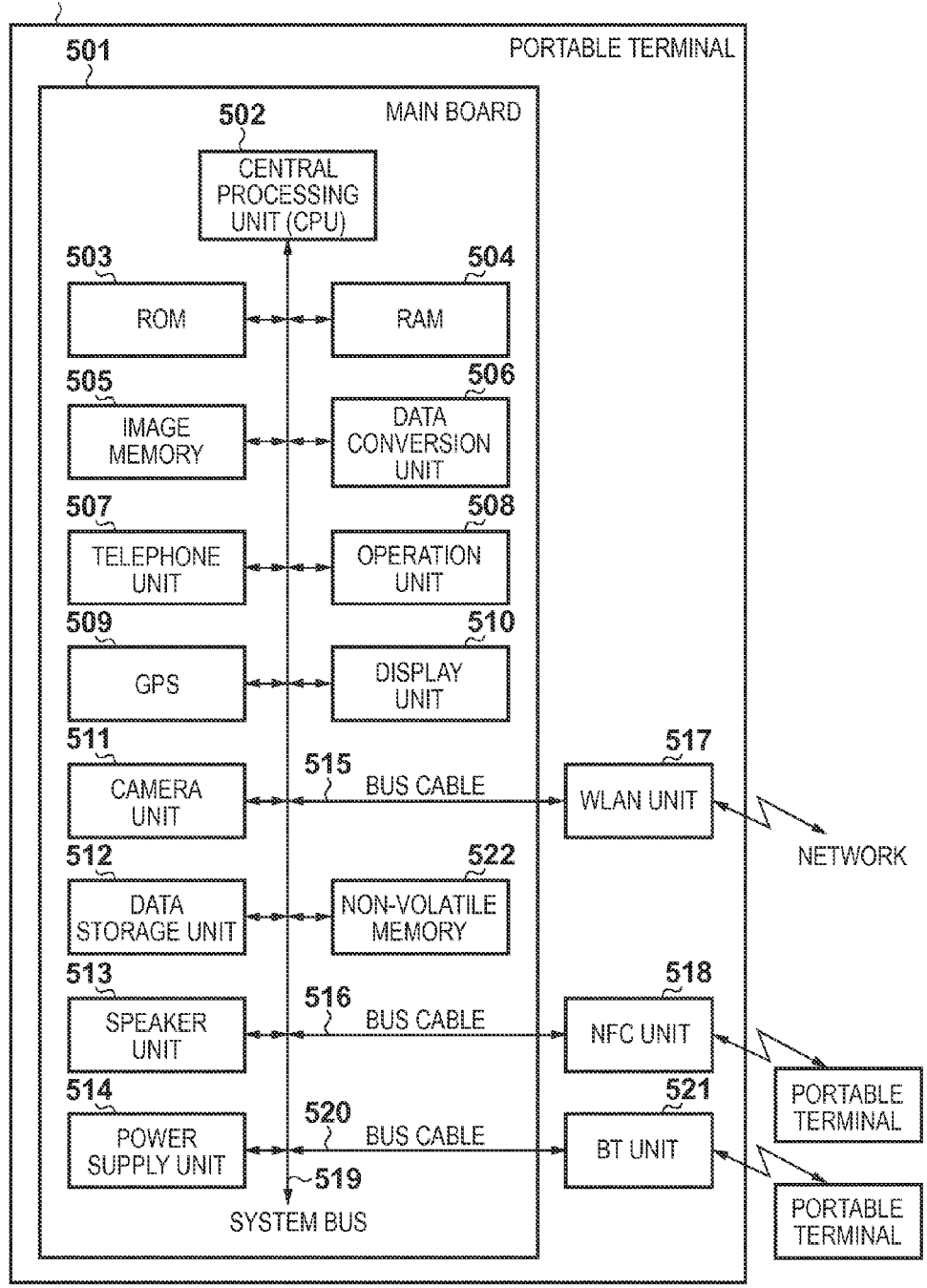

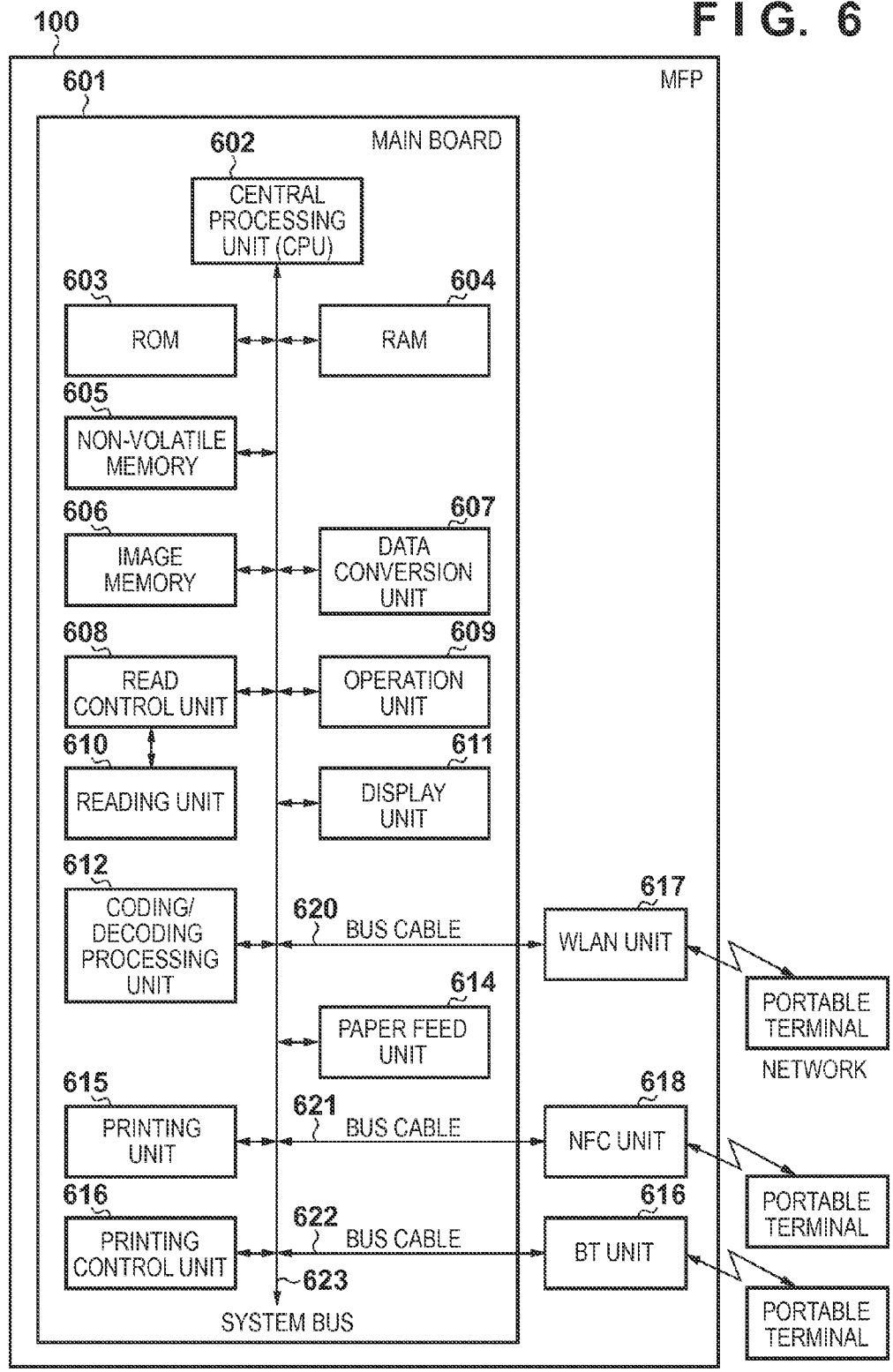

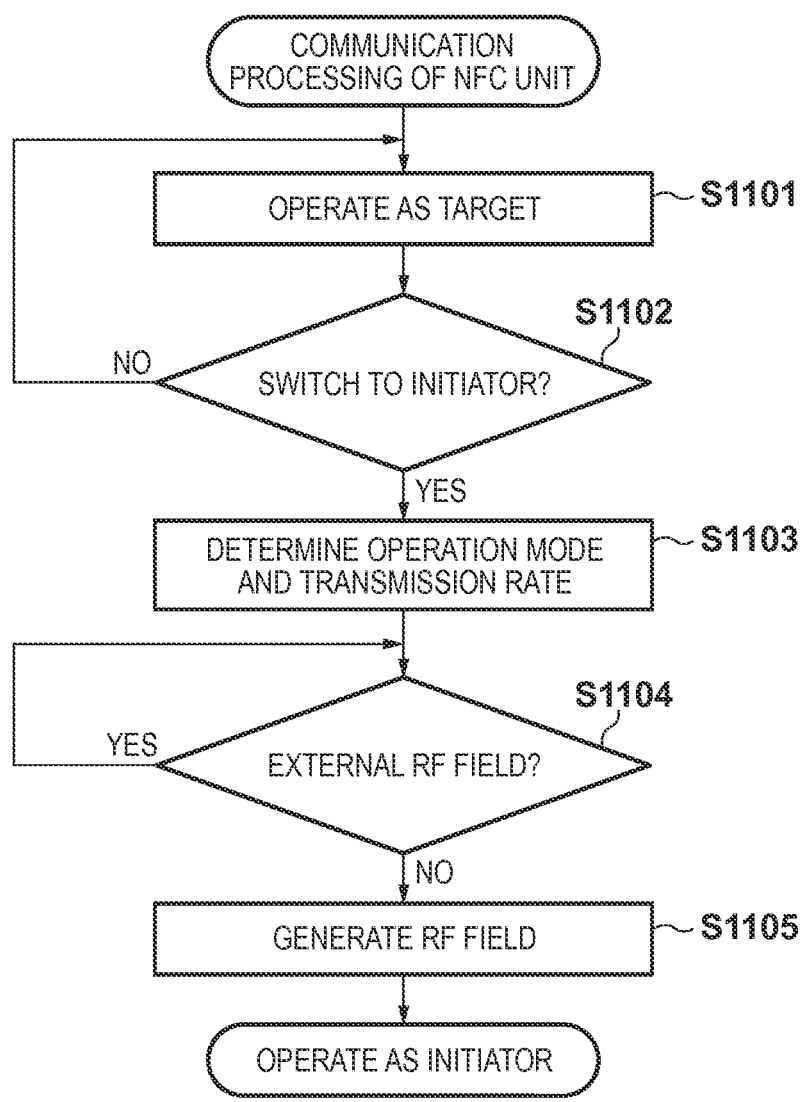

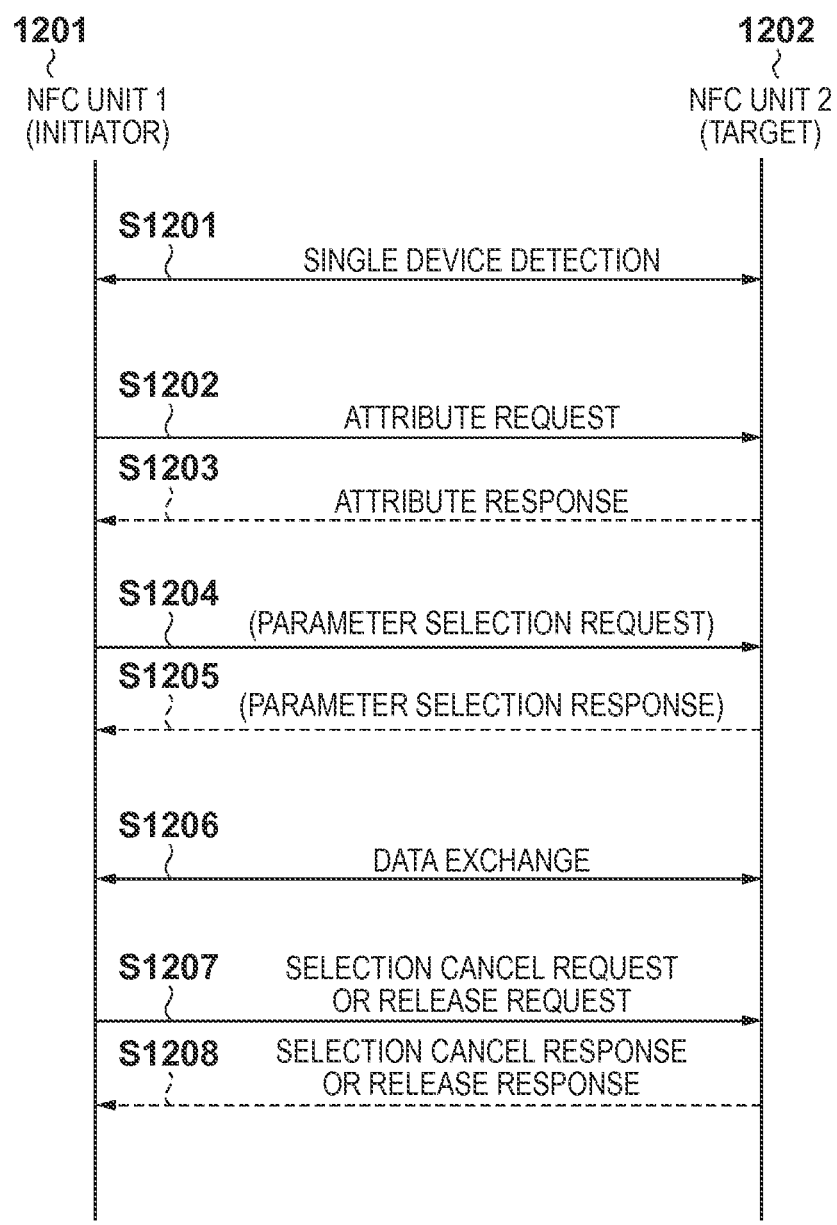

INFORMATION PROCESSING APPARATUS, CONTROL METHOD OF INFORMATION PROCESSING APPARATUS, AND STORAGE MEDIUM STORING PROGRAM

CROSS REFERENCE TO RELATED APPLICATION

This application is a continuation of U.S. application Ser. No. 13/777,446 filed on Feb. 26, 2013, the entire disclosure of which is hereby incorporated by reference herein. This application also claims foreign priority under 35 U.S.C. §119 of Japanese Application No. 2012-048620 filed on Mar. 5, 2012.

BACKGROUND OF THE INVENTION

Field of the Invention

The present invention relates to an information processing apparatus for designating an apparatus to be caused to execute processing, a control method of an information processing apparatus, and a storage medium storing a program.

Description of the Related Art

A recent portable communication terminal is known to perform short distance wireless communication in addition to communication via a communication network. The communication apparatus of the partner of the short distance wireless communication is, for example, a portable communication terminal or an MFP (Multi Function Printer), and image data or the like is transmitted and received. To implement efficient communication considering the communication speed and operability, the short distance wireless communication is performed using two types of communication methods. Japanese Patent Laid-Open No. 2007-166538 describes exchanging information necessary for a second short distance wireless communication method of the target communication apparatus using a first short distance wireless communication method capable of properly specifying the communication partner, and performing high-speed communication by the second short distance wireless communication method using the information.

The first short distance wireless communication method is, for example, NFC (Near Field Communication), and the second short distance wireless communication method is, for example, Bluetooth® or wireless LAN. In Japanese Patent Laid-Open No. 2007-166538, first, the communication method and the encryption method of the next communication are transmitted using NFC. If communication can be switched, the communication is switched, and printing is performed using the second communication method.

However, the technique described in Japanese Patent Laid-Open No. 2007-166538 does not search for the processing target apparatus by the second short distance wireless communication method such as Bluetooth. For this reason, if the user does not decide the processing target apparatus to be caused to perform communication by the second short distance wireless communication method, he/she may be unable to specify an appropriate apparatus.

SUMMARY OF THE INVENTION

An aspect of the present invention is to eliminate the above-mentioned problems with the conventional technology. The present invention provides an information processing apparatus capable of easily searching for an apparatus to be caused to execute processing, a control method of an information processing apparatus, and a storage medium storing a program.

The present invention in its first aspect provides an information processing apparatus capable of executing a first wireless communication method and a second wireless communication method having a communication range wider than that of the first wireless communication method, comprising: a search unit configured to search for an apparatus to be caused to execute predetermined processing, by using both the first wireless communication method and the second wireless communication method; and a decision unit configured to, in a case where the search unit has found a common apparatus by using both the first wireless communication method and the second wireless communication method, decide the common apparatus as the apparatus to be caused to execute the predetermined processing by the second wireless communication method.

The present invention in its second aspect provides a control method of an information processing apparatus capable of executing a first wireless communication method and a second wireless communication method having a communication range wider than that of the first wireless communication method, the method comprising: a search step of searching for an apparatus to be caused to execute predetermined processing, by using both the first wireless communication method and the second wireless communication method; and a decision step of, in a case where a common apparatus has been found in the search step by using both the first wireless communication method and the second wireless communication method, deciding the common apparatus as the apparatus to be caused to execute the predetermined processing by the second wireless communication method.

The present invention in its third aspect provides a non-transitory computer-readable storage medium storing a program that causes a computer to execute: a search step of searching for an apparatus to be caused to execute predetermined processing, by using both a first wireless communication method and a second wireless communication method having a communication range wider than that of the first wireless communication method; and a decision step of, in a case where a common apparatus has been found in the search step by using both the first wireless communication method and the second wireless communication method, deciding the common apparatus as the apparatus to be caused to execute the predetermined processing by the second wireless communication method.

According to the present invention, the user can easily search for an apparatus to be caused to execute processing.

Further features of the present invention will become apparent from the following description of exemplary embodiments with reference to the attached drawings.

BRIEF DESCRIPTION OF THE DRAWINGS

FIGS. 4A and 4B are views showing an example in which the thumbnails of printing candidates are displayed;

FIG. 5 is a block diagram showing the arrangement of the portable communication terminal;

FIG. 6 is a block diagram showing the arrangement of the MFP;

FIG. 11 is a flowchart showing the procedure of causing the NFC unit to operate as an initiator;

FIG. 12 is a sequence chart showing the sequence of performing data exchange in the passive mode;

DESCRIPTION OF THE EMBODIMENTS

Figure 1:
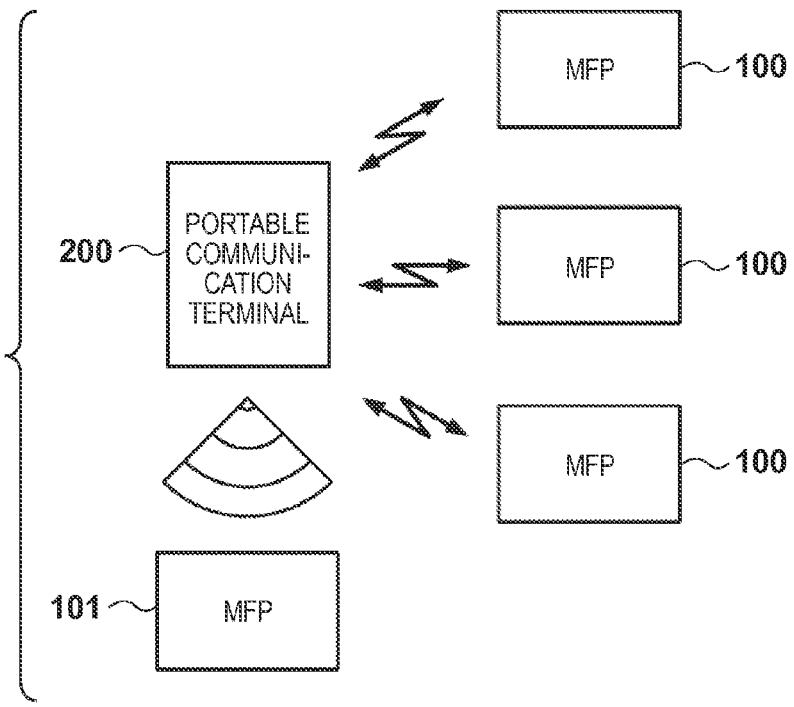
FIG. 1 is a view showing the arrangement of a wireless communication system.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same constituent elements, and a description thereof will be omitted.

In this embodiment, an example will be described in which authentication is performed first using a short distance wireless communication method (first communication) for low-speed communication, and print data is then transmitted after switching to high-speed wireless communication (second communication). More specifically, a printing method using a technique of performing authentication using a short distance wireless communication method such as NFC (Near Field Communication) and then handing over the communication to wireless communication of another communication method will be explained.

FIG. 1 is a view showing the arrangement of a wireless communication system according to this embodiment. This system includes a portable communication terminal 200 (a portable terminal as an example of an information processing apparatus), and MFPs (Multi Function Printers) 100 and 101. The portable communication terminal 200 has at least two types of wireless communication methods capable of executing communication using different authentication methods and different communication speeds. The portable communication terminal 200 need only be an apparatus capable of handling files of print targets, for example, a personal information terminal such as a PDA (Personal Digital Assistant), a mobile phone, or a digital camera. The MFP 100 that is an example of a print apparatus has a reading function of reading a document placed on a platen glass, and a printing function using a printing unit such as an inkjet printer. The MFP 100 may also have a FAX function and a telephone function. The portable communication terminal 200 and the MFP 100 communicate via WLAN. That is, the portable communication terminal 200 and the MFP 100 can perform peer to peer (P2P) communication by authenticating each other because both have the WLAN function. The portable communication terminal 200 and the MFP 101 communicate via NFC.

Figure 2:
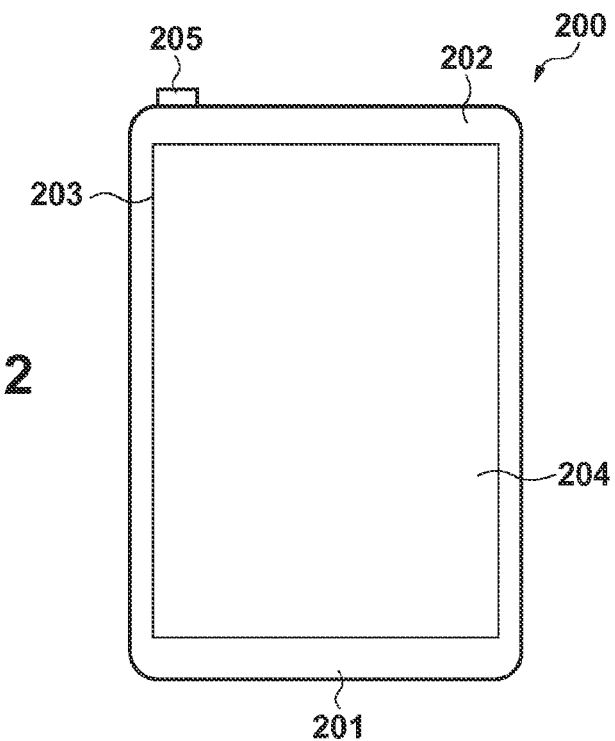
FIG. 2 is a view showing the outer appearance of a portable communication terminal.

FIG. 2 is a view showing the outer appearance of the portable communication terminal 200. In this embodiment, for example, a smartphone is used as the portable communication terminal 200. The smartphone is a multifunctional mobile phone including a camera, a network browser, a mail function, and the like as well as the functions of a mobile phone. An NFC unit 201 performs communication using NFC. Actually, communication can be performed when the user moves the NFC unit 201 close to within about 10 cm of the NFC unit of the communication partner. A WLAN unit 202 is a unit used to perform communication by WLAN and is provided in the apparatus. Note that the communication range of WLAN is wider than the communication range (about 10 cm) of the above-described NFC.

A display unit 203 is a display having an LCD display mechanism. An operation unit 204 includes a touch-panel operation mechanism and detects press by the user. As a representative operation method, the display unit 203 displays button-shaped images, and when the user presses the operation unit 204, an event of press on a button is issued. A power supply key 205 is used by the user to power on/off the apparatus.

Figure 3A:
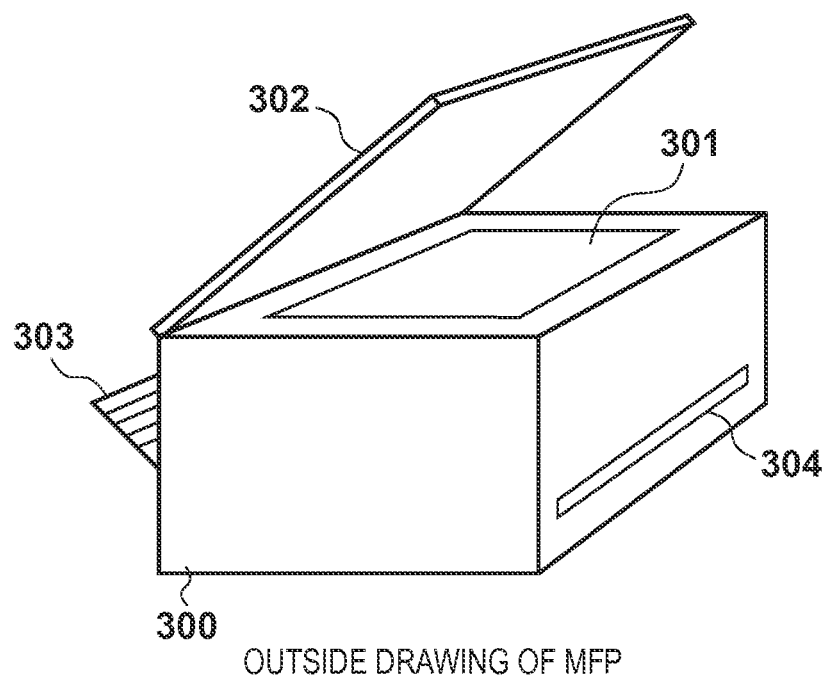
FIGS. 3A and 3B are views showing the outer appearance of an MFP.
Figure 3B:
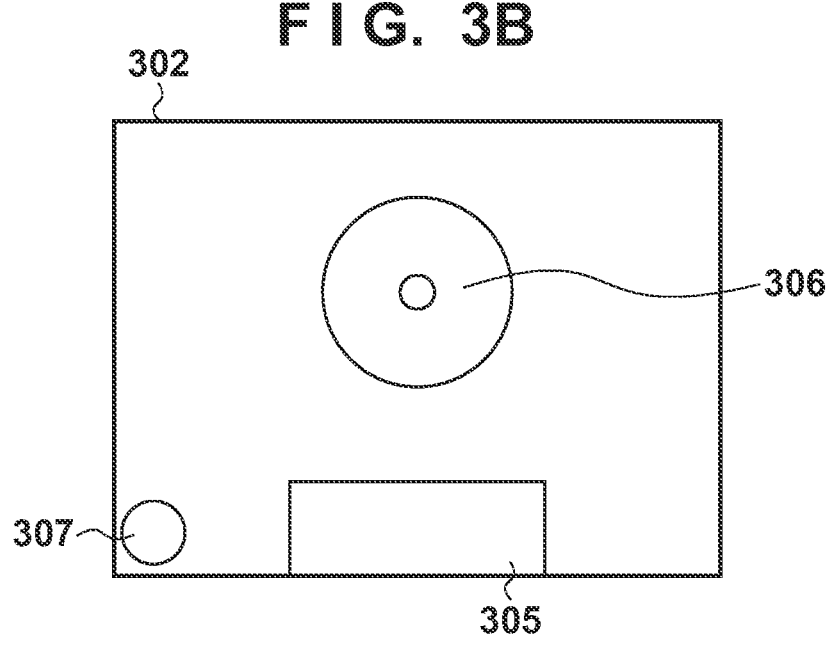

FIGS. 3A and 3B are views showing the outer appearance of the MFP. A platen glass 301 is a transparent glass table and is used to place a document to be read by a scanner. A document cover 302 is used to prevent reading light from externally leaking at the time of reading by the scanner. A printing paper insert port 303 is used to set paper sheets of various sizes. The paper sheets set in the printing paper insert port 303 are conveyed to the printing unit one by one, undergo desired printing, and are discharged from a printing paper discharge port 304. An operation display unit 305 and an NFC unit 306 are provided on the document cover 302. The operation display unit 305 will be described later with reference to FIGS. 4A and 4B. The NFC unit 306 is a unit used to perform short distance wireless communication and a portion where the user actually sets close to the communication partner. The effective range of contact is about 10 cm from the NFC unit 306. A WLAN antenna 307 is used to perform communication by WLAN.

FIGS. 4A and 4B are views showing examples of display on the portable communication terminal 200. An image selection screen shown in FIG. 4A illustrates an example in which the thumbnails of printing candidates are displayed. A thumbnail 401 is the thumbnail of each image data saved in the portable communication terminal 200 or a server apparatus (not shown). When the user presses an image to be printed, a focus 402 is displayed to indicate that the image is the print target. The user can select a plurality of print target images. At this time, a plurality of focuses 402 exist on the display unit 203. If not all the thumbnails can be displayed in one screen, scroll display may be performed. Upon completing selection of the image to be printed, the user presses a print start key 403 to transmit the print job to the print apparatus.

A printer selection screen shown in FIG. 4B illustrates an example of a printer selection screen. In this embodiment, printers A and B are found by a search using WLAN. A printer A 404 shows a WLAN connection state including the information of the network name, signal strength, encryption, channel, MAC address, access key, and the like. The network name is a character string arbitrarily settable by the user. The signal strength indicates the strength of the radio signal. Encryption represents whether the signal is encrypted. The channel indicates the frequency width necessary for data transmission/reception. The MAC address is identification information assigned to each wireless communication apparatus in WLAN communication. The access key is a value (authentication information) used for authentication at the time of access by WLAN. Whether to set the access key is left to the user's discretion. If the access key is set, it needs to be input when accessing the MFP.

FIG. 5 is a block diagram of the portable communication terminal 200. The portable communication terminal 200 includes a main board 501 that performs main control of the apparatus, a WLAN unit 517 that performs WLAN communication, an NFC unit 518 that performs NFC communication, and a BT unit 521 that performs Bluetooth® communication.

A CPU 502 of the main board 501 is a system control unit and controls the entire portable communication terminal 200. A ROM 503 stores control programs, an embedded operating system (OS) program, and the like to be executed by the CPU 502. In this embodiment, each control program stored in the ROM 503 performs software control such as scheduling and task switching under the management of the embedded OS stored in the ROM 503.

A RAM 504 is formed from an SRAM (static RAM) or the like. The RAM 504 stores program control variables, set values registered by the user, management data of the portable communication terminal 200, and the like, and also includes various kinds of work buffer areas. An image memory 505 is formed from a DRAM (dynamic RAM) or the like. The image memory 505 temporarily stores image data received via each communication unit or image data read out from a data storage unit 512 for processing by the CPU 502. A non-volatile memory 522 is formed from a flash memory or the like and stores data to be saved even after power-off. Examples of the data are telephone directory data and information of devices connected in the past. Note that the memory structure is not limited to this. For example, the image memory 505 and the RAM 504 may share a memory, or data may be backed up in the data storage unit 512. In this embodiment, a DRAM is used. However, a hard disk, a non-volatile memory, or the like may be used.

A data conversion unit 506 performs analysis of a data description language (PDL) or data conversion such as color conversion and image conversion. A telephone unit 507 controls a telephone line and processes voice data input/output via a speaker unit 513 to implement communication by telephone. An operation unit 508 controls the signal of the operation unit 204 described with reference to FIG. 2. A GPS (Global Positioning System) 509 obtains the current latitude and longitude. A display unit 510 electronically controls the display contents of the display unit 203 described with reference to FIG. 2 and can display various kind of input operations, the operation state and status of the connected print apparatus, and the like. A camera unit 511 has a function of electronically recording and coding an image input via a lens. The image captured by the camera unit 511 is saved in a data storage unit 512. The speaker unit 513 implements a function of inputting or outputting a voice for the telephone function, an alarm notification function, and the like. A power supply unit 514 is, for example, a portable battery and controls the power supply. Power supply states include a battery dead state corresponding to a zero battery level, a power off state before the user presses the power supply key 205, an active state in which the apparatus is normally activated, and a power saving state in which the apparatus is activated, but the power is saved.

The portable communication terminal 200 includes three components used for wireless communication. The portable communication terminal 200 can perform wireless communication by WLAN, NFC, and Bluetooth®. The WLAN unit 517, the NFC unit 518, and the BT unit 521 are communication units that perform data communication with another apparatus such as an MFP. Each of the units 517, 518, and 521 converts data into packets and transmits the packets to another apparatus. Reversely, each unit converts packets from another external apparatus into data and transmits the data to the CPU 502. The WLAN unit 517, the NFC unit 518, and the BT unit 521 are connected to a system bus 519 by bus cables 515, 516, and 520, respectively. The WLAN unit 517, the NFC unit 518, and the BT unit 521 are units configured to implement communication complying with the standards. Details of the NFC unit 518 will be described later with reference to FIG. 7.

The above-described units 503 to 514, 517, 518, 521, and 522 are connected to each other via the system bus 519 managed by the CPU 502.

FIG. 6 is a block diagram showing the schematic arrangement of the MFPs 100 and 101. Although the MFP 100 will be described below, the description also applies to the MFP 101. The MFP 100 includes a main board 601 that performs main control of the apparatus, a WLAN unit 617 that performs WLAN communication, an NFC unit 618 that performs NFC communication, and a BT unit 619 that performs Bluetooth® communication.

A CPU 602 of the main board 601 is a system control unit and controls the entire MFP 100. A ROM 603 stores control programs, an embedded operating system (OS) program, and the like to be executed by the CPU 602. In this embodiment, each control program stored in the ROM 603 performs software control such as scheduling and task switching under the management of the embedded OS stored in the ROM 603.

A RAM 604 is formed from an SRAM (static RAM) or the like. The RAM 604 stores program control variables, set values registered by the user, management data of the MFP 100, and the like, and also includes various kinds of work buffer areas. A non-volatile memory 605 is formed from a flash memory or the like and stores data to be held even after power-off. Examples of the data are network connection information and user data. An image memory 606 is formed from a DRAM (dynamic RAM) or the like. The image memory 606 stores image data received via each communication unit, image data processed by a coding/decoding processing unit 612, and the like. Like the memory structure of the portable communication terminal 200, the memory structure is not limited to the above-described structure. A data conversion unit 607 performs analysis of a data description language (PDL) or conversion of image data into print data.

A read control unit 608 will be described. A reading unit 610 optically reads a document by a CIS image sensor (contact type image sensor). Next, the reading unit 610 performs, for the image signal converted into electrical image data, various kinds of image processing such as binarization processing and halftone processing via an image processing control unit (not shown) and outputs high-resolution image data.

An operation unit 609 is used by the user to perform operations, and various forms are used. For example, the operation unit may include hard keys such as a 4-way selector, a set key, and a stop key or use a touch panel. A display unit 611 uses, for example, a dot matrix LCD. The coding/decoding processing unit 612 performs coding/decoding processing or enlargement/reduction processing for the image data (JPEG, PNG, or the like) handled by the MFP 100. A paper feed unit 614 holds printing paper sheets. The paper feed unit 614 can feed paper under the control of a print control unit 616. Especially, the paper feed unit 614 may include a plurality of paper feed units to hold a plurality of kinds of printing paper sheets in one apparatus. The print control unit 616 controls from which the paper feed unit feeds paper.

The print control unit 616 converts the image data to be printed into high-resolution image data by performing various kinds of image processing such as smoothing processing, printing density correction processing, and color correction via the image processing control unit (not shown) and outputs the image data to a printing unit 615. The print control unit 616 also has a function of periodically reading out the information of the printing unit and updating the information in the RAM 604. The information of the printing unit includes, for example, the ink amount remaining in the ink tank and the state of the printhead. The MFP 100 also includes three components used for wireless communication with the portable communication terminal 200, as described above. The units 603 to 619 are communicably connected to each other via a system bus 623 managed by the CPU 602.

Figure 7:
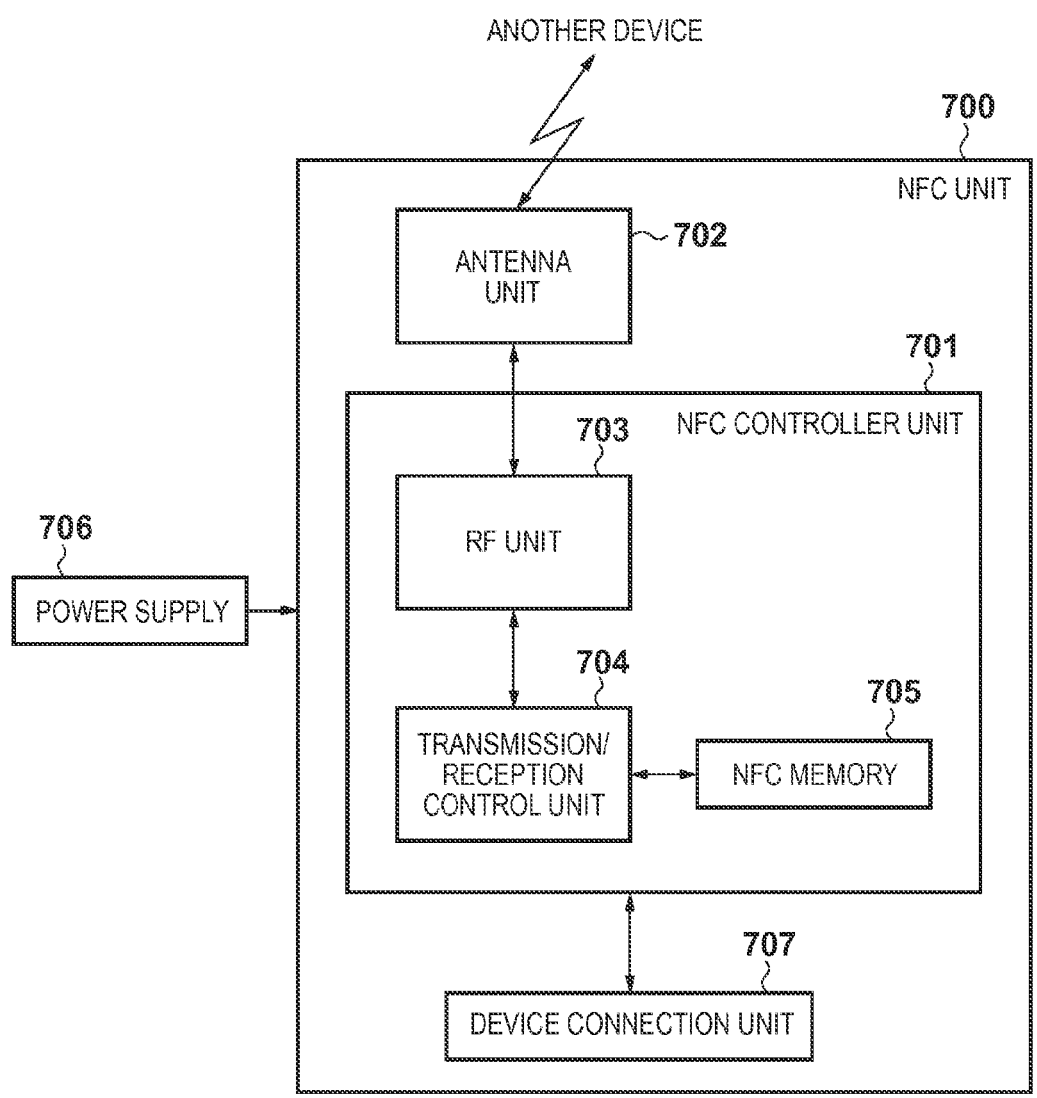
FIG. 7 is a block diagram showing the detailed arrangement of an NFC unit.

FIG. 7 is a block diagram showing the detailed arrangement of an NFC unit 700 used as the NFC unit 518 or the NFC unit 618. The NFC unit 700 includes an NFC controller unit 701, an antenna unit 702, an RF unit 703, a transmission/reception control unit 704, an NFC memory 705, a power supply 706, and a device connection unit 707. The antenna unit 702 receives a radio wave or a carrier from another NFC device or transmits a radio wave or a carrier to another NFC device. The RF unit 703 has a function of modulating/demodulating an analog signal into a digital signal. The RF unit 703 includes a synthesizer, identifies the frequency of a band or a channel, and controls the band or channel by frequency assignment data. The transmission/reception control unit 704 performs control concerning transmission/reception, including frame segmentation and reassembly, preamble addition and detection, and frame identification. The transmission/reception control unit 704 also controls the NFC memory 705 and reads/writes various kinds of data and programs.

When the NFC unit 700 operates in the active mode, it receives power via the power supply 706. The NFC unit 700 communicates with a device via the device connection unit 707 or communicates with another NFC device within a communication range by generating an electromotive force in the device by electromagnetic induction using a carrier transmitted/received via the antenna unit 702. On the other hand, when the NFC unit 700 operates in the passive mode, it receives a carrier from another NFC device via the antenna and receives power from the other NFC device on the communication partner side by electromagnetic induction. The NFC unit 700 then communicates with the other NFC device by modulating the carrier, thereby transmitting/receiving a carrier.

NFC communication will be explained next. When short distance wireless communication using the NFC unit is performed, an apparatus that starts the short distance wireless communication first by sending an RF field (Radio Frequency field) is called an initiator. An apparatus that communicates with the initiator by responding to a command issued by the initiator is called a target. The NFC unit has a passive mode and an active mode as the communication modes. In the passive mode, the target responds to the command of the initiator by performing load modulation of the RF field sent from the initiator. On the other hand, in the active mode, the target responds to the command of the initiator by sending an RF field by itself.

Figure 9A:
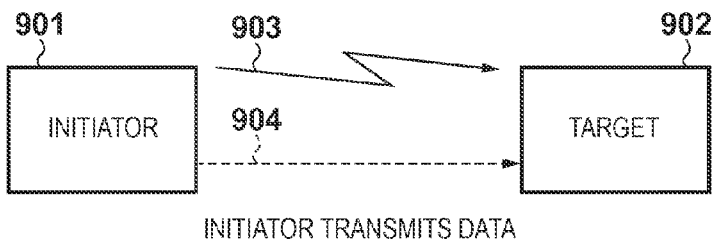
FIGS. 9A and 9B are views showing the concept of a passive mode in NFC communication.
Figure 9B:
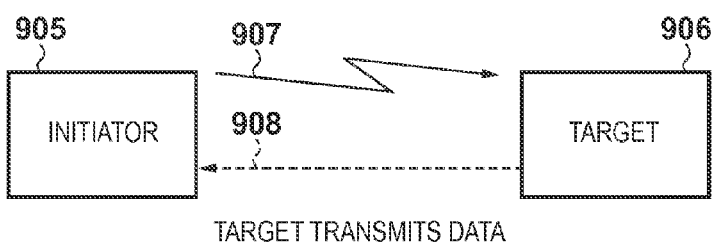

FIGS. 9A and 9B are views showing the concept of the passive mode in NFC communication. As shown in FIG. 9A, when an initiator 901 is to transmit data 904 to a target 902 in the passive mode, the initiator 901 generates an RF field 903. The initiator 901 modulates the RF field 903 by itself, thereby transmitting the data 904 to the target 902. As shown in FIG. 9B, when a target 906 is to transfer data 908 to an initiator 905 in the passive mode, the initiator 905 generates an RF field 907, as in FIG. 9A. The target 906 performs load modulation of the RF field 907, thereby transmitting the data 908 to the initiator 905.

Figure 10A:
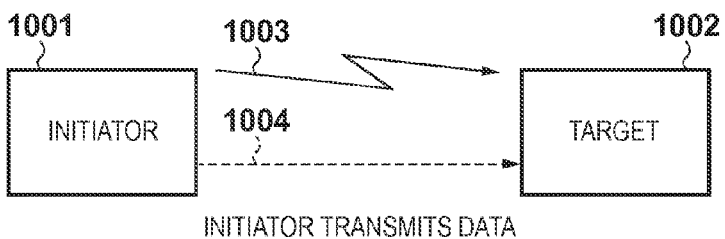
FIGS. 10A and 10B are views showing the concept of an active mode in NFC communication.
Figure 10B:
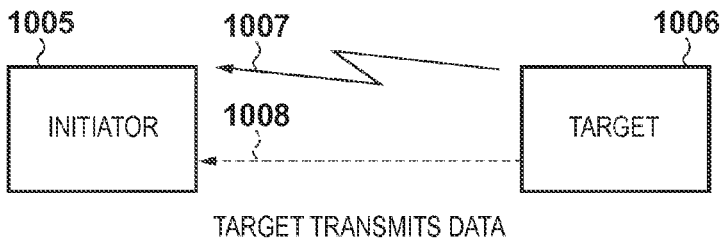

FIGS. 10A and 10B are views showing the concept of the active mode in NFC communication. As shown in FIG. 10A, when an initiator 1001 is to transmit data 1004 to a target 1002 in the active mode, the initiator 1001 generates an RF field 1003. The initiator 1001 modulates the RF field 1003 by itself, thereby transmitting the data 1004 to the target 1002. When data transmission is completed, the initiator 1001 stops outputting the RF field 1003. As shown in FIG. 10B, when a target 1006 is to transmit data 1008 to an initiator 1005 in the active mode, the target 1006 generates an RF field 1007. The target 1006 transmits the data 1008 by the RF field 1007 generated by itself and stops outputting the RF field 1007 upon completing transmission.

FIG. 11 is a flowchart showing the procedure of causing an NFC unit to operate as an initiator. Each process shown in FIG. 11 is executed by the CPU and the like of the apparatus incorporating the NFC unit. First, in step S1101, every NFC unit operates as a target and waits for a command from an initiator. In step S1102, the NFC unit can switch to an initiator in response to a request from an application that controls communication complying with the NFC standards. If the NFC unit has responded to the request to switch to the initiator, the application selects one of the active mode and the passive mode and decides the transmission rate in step S1103. In step S1104, the initiator detects the existence of an RF field output from an apparatus other than itself. Upon detecting the existence of an external RF field, the initiator does not generate the RF field of its own. If the existence of an external RF field is not detected, the process advances to step S1105, and the initiator generates the RF field of its own. With the above-described processes, the NFC unit starts the operation as the initiator.

FIG. 12 is a sequence chart showing the sequence of performing data exchange in the passive mode. A case will be described below in which a first NFC unit 1201 operates as the initiator, and a second NFC unit 1202 operates as a target. In step S1201, the first NFC unit 1201 performs single device detection and specifies the second NFC unit 1202. That is, in step S1201, the first NFC unit 1201 and the second NFC unit 1202 detect each other's existence. In step S1202, the first NFC unit 1201 transmits the identifier of its own, the bit transmission rate of transmission/reception, the effective data length, and the like to the partner as an attribute request. The attribute request has general purpose bytes which can arbitrarily be selected and used. Upon receiving an effective attribute request, the second NFC unit 1202 transmits an attribute response in step S1203. Transmission from the second NFC unit 1202 is done by load modulation. Data transmission by load modulation is indicated by a dotted arrow in FIG. 12.

After confirming an effective attribute response, the first NFC unit 1201 can change the parameters of the subsequent transmission protocol by transmitting a parameter selection request in step S1204. Parameters included in the parameter selection request are, for example, the transmission rate and the effective data length. Upon receiving an effective parameter selection request, the second NFC unit 1202 transmits a parameter selection response in step S1205 so as to change the parameters. Note that steps S1204 and S1205 may be omitted if the parameter change is not to be performed.

In step S1206, the first NFC unit 1201 and the second NFC unit 1202 exchange data by a data exchange request and a data exchange response. At the time of the data exchange request and the data exchange response, information for an application provided in the communication partner or the like can be transmitted as data. If the data size is large, the data can divisionally be transmitted.

When the data exchange has ended, the process advances to step S1207, and the first NFC unit 1201 transmits one of a selection cancel request and a release request. When the selection cancel request is transmitted, the second NFC unit 1202 transmits a selection cancel response in step S1208. Upon receiving the selection cancel response, the first NFC unit 1201 releases the attribute representing the second NFC unit 1202, and the process returns to step S1201. When the release request is transmitted, the second NFC unit 1202 transmits a release response in step S1208 and returns the initial state. Upon receiving the release response, the first NFC unit 1201 may return to the initial state because the target is completely released.

Figure 13:
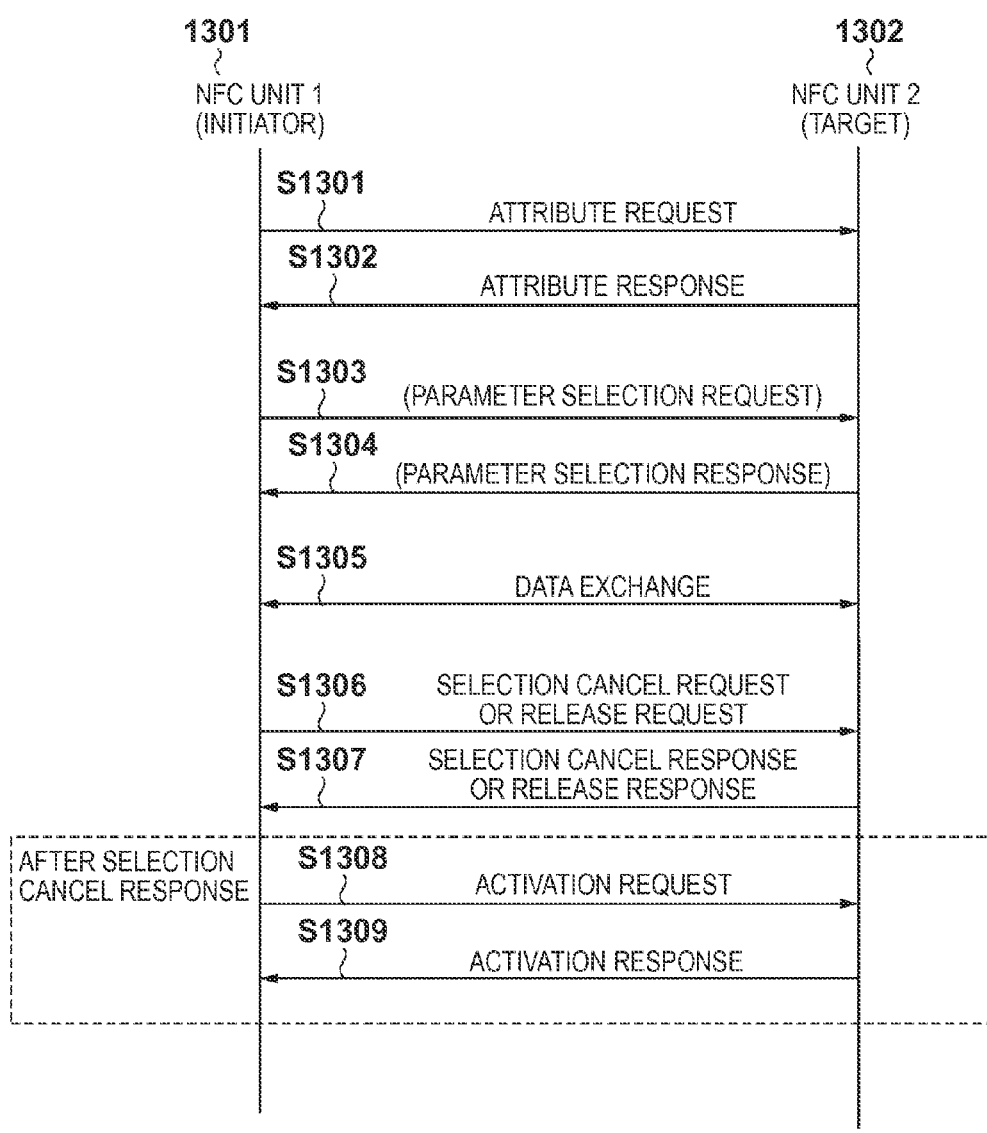
FIG. 13 is a sequence chart showing the sequence of performing data exchange in the active mode.

FIG. 13 is a sequence chart showing the sequence of performing data exchange in the active mode. A case will be described below in which a first NFC unit 1301 operates as the initiator, and a second NFC unit 1302 operates as a target. In step S1301, the first NFC unit 1301 transmits the identifier of its own, the bit transmission rate of transmission/reception, the effective data length, and the like as an attribute request. Upon receiving an effective attribute request, the second NFC unit 1302 transmits an attribute response in step S1302. Transmission from the second NFC unit 1302 is done by an RF field generated by itself. For this reason, the first and second NFC units stop outputting the RF fields when ending data transmission.

After confirming an effective attribute response, the first NFC unit 1301 can change the parameters of the transmission protocol by transmitting a parameter selection request in step S1303. Parameters included in the parameter selection request are the transmission rate and the effective data length. Upon receiving an effective parameter selection request, the second NFC unit 1302 transmits a parameter selection response in step S1304 so as to change the parameters. Note that steps S1303 and S1304 may be omitted if the parameter change is not to be performed, as in the passive mode.

In step S1305, the first NFC unit 1301 and the second NFC unit 1302 exchange data by a data exchange request and a data exchange response. At the time of the data exchange request and the data exchange response, information for an application or the like can be transmitted as data. If the data size is large, the data can divisionally be transmitted.

When the data exchange has ended, the process advances to step S1306, and the first NFC unit 1301 transmits one of a selection cancel request and a release request. When the selection cancel request is transmitted, the second NFC unit 1302 transmits a selection cancel response in step S1307. Upon receiving the selection cancel response, the first NFC unit 1301 releases the attribute representing the second NFC unit 1302. After that, in step S1308, the first NFC unit 1301 transmits an activation request to another target whose identifier is known. Upon receiving the activation request, the target transmits an activation response in step S1309, and the process returns to step S1301. When the release request is transmitted in step S1306, the second NFC unit 1302 transmits a release response in step S1307 and returns the initial state. Upon receiving the release response, the first NFC unit 1301 may return to the initial state because the target is completely released.

Figure 16:
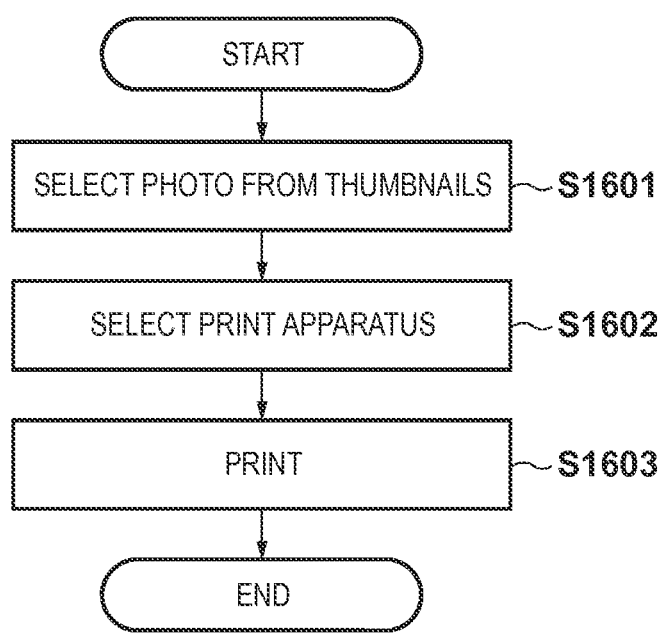
FIG. 16 is a flowchart showing the procedure of executing printing in the portable communication terminal.

FIG. 16 is a flowchart showing the procedure until printing in the print apparatus is executed from the portable communication terminal. Each process shown in FIG. 16 is executed by the CPU 502 and the like of the portable communication terminal. In step S1601, the user selects a photo to be printed using the portable communication terminal 200. For example, the function described concerning the image selection screen shown in FIG. 4A is used. When the user selects a desired photo while viewing the thumbnails 401, the focus 402 is displayed. When the user presses the print start key 403, the process advances to step S1602. When the user selects a print apparatus on the printer selection screen shown in FIG. 4B, the portable communication terminal 200 generates a print job that sets the selected image data as the print target in step S1603.

After selecting a photo in step S1601, the user may detect the print apparatus by bringing the NFC unit of the portable communication terminal 200 close to the NFC unit of the print apparatus and transmit the generated print job to the print apparatus. If no focus 402 is displayed at all, the portable communication terminal 200 sends no RF field not to detect the print apparatus by NFC. If at least one focus 402 is selected, the portable communication terminal sends an RF field because printing can be performed based on the selected image data. When the user additionally selects the thumbnail 401 during sending of the RF field, a focus is additionally displayed. This allows the user to select a print apparatus while selecting photos and also prevent an operation error (for example, erroneous execution of printing) caused by unintended NFC contact when no photo is selected.

Figure 8:
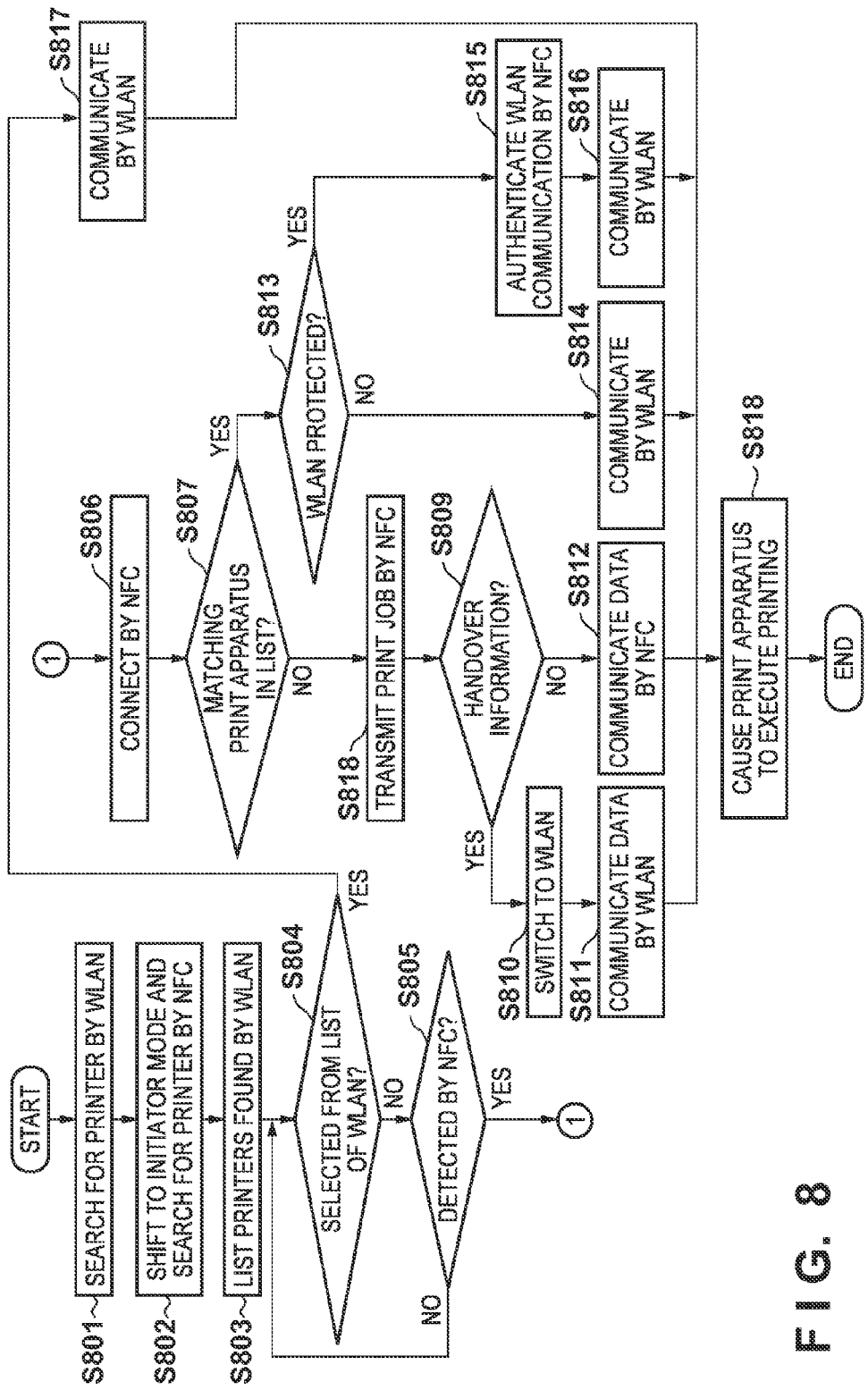
FIG. 8 is a flowchart showing the procedure of a communication control method according to the embodiment.

FIG. 8 is a flowchart showing the procedure of a communication control method of causing the portable communication terminal 200 to select a print apparatus by both WLAN communication and NFC communication and then performing selection control of WLAN communication and NFC communication. Each process shown in FIG. 8 is executed by the CPU 502 of the portable communication terminal 200. The processes shown in FIG. 8 are executed in steps S1602 and S1603 of FIG. 16. In step S801, the portable communication terminal 200 searches, via WLAN, for a print apparatus capable of printing image data the user has specified on the portable communication terminal 200. In step S802, the NFC unit of the portable communication terminal 200 is shifted from the target mode to the initiator mode and thus set in a state capable of detecting a print apparatus in close vicinity. Processing of performing communication in the initiator mode has been described above with reference to FIG. 11.

As described above, in the processing shown in FIG. 8, a printer is searched for by WLAN, and simultaneously, the portable communication terminal is changed to the initiator to search for a printer by NFC as well. Hence, even when the user does not designate one of the search methods, a printer found by the WLAN or NFC search method can be specified as the candidate of the apparatus to be caused to execute printing.

In step S803, a list of print apparatuses capable of printing in the communication range, which are found in step S801, is displayed on the printer selection screen shown in FIG. 4B. In step S804, it is determined whether a print apparatus desired by the user is selected on the print apparatus list displayed in step S803. Upon determining that a print apparatus is selected, the process advances to step S817 to transmit a print job to the print apparatus via WLAN and cause the print apparatus to print. On the other hand, upon determining that no print apparatus is selected, the process advances to step S805 to determine whether the NFC unit of the portable communication terminal 200 has detected a print apparatus in close vicinity. Upon determining that a print apparatus is detected, the process advances to step S806. Upon determining that no print apparatus is detected, the process returns to step S804. Steps S804 and S805 are executed at a short periodical interval.

In this example, assume that the print apparatus detected via NFC is the MFP 101. In step S806, mutual device authentication is performed between the MFP 101 and the portable communication terminal 200 via NFC. The mutual device authentication is performed using, for example, a device name arbitrarily set by the user, the serial ID of the MFP unique to each device, the model number of the MFP, capability information representing the capability of the MFP, NFC-ID, or information about LAN. Information about LAN includes, for example, items described concerning the printer selection screen shown in FIG. 4B. Instead, the system may be defined to exchange unique information.

In step S807, it is determined whether the print apparatus that matches the MFP 101 detected in step S805 exists in the list of print apparatuses found by WLAN in step S803. Examples of information used to determine whether the print apparatus matches are the MAC address, network name, and the serial ID of the MFP. Any other uniquely decided information may be used if it can uniquely specify a print apparatus. Upon determining in step S807 that a print apparatus that matches exists, the process advances to step S813. Upon determining that a print apparatus that matches does not exist, the process advances to step S808.

Since the print apparatus detected via NFC is not found via WLAN, the portable communication terminal 200 transmits a print job to the MFP 101 via NFC in step S808. The print job describes the print settings and the image data storage location. The print settings are, for example, information such as the print mode and the paper size. The image data storage location includes the image data name, the address of the apparatus in which the image data is stored, path information to the storage location, the connection ID, and the like.

As described above, the print job can be transmitted in step S808. For this reason, even if the printer desired by the user is not found by WLAN, the printer can be caused to execute printing.

Steps S809 to S812 correspond to processing of switching the communication method (handover) and performing printing. In this embodiment, switching is done between two different communication methods. Authentication for a high-speed communication method is performed using a low-speed secure communication method. After that, image data having a larger size is communicated using the high-speed communication method. Details will be described later with reference to FIG. 15. In step S809, the communication method is switched based on whether switching information exists. In step S818, the print apparatus is caused to execute printing.

Steps S813 to S816 correspond to processing of switching to communication via WLAN because the print apparatus detected via NFC exists in the list of print apparatuses found via WLAN. In step S813, it is determined whether the WLAN is protected. This determination is done based on, for example, whether a network key is necessary for connecting to the print apparatus of the WLAN connection destination. Upon determining that the WLAN is protected, the process advances to step S815. Upon determining that the WLAN is not protected, the process advances to step S814. In step S814, since the network key is unnecessary, the portable communication terminal 200 directly switches to communication via WLAN and is connected to the print apparatus via WLAN. In step S815, the network key is received from the portable communication terminal 200 via NFC. This is because communication information would not externally leak in NFC that is short distance wireless communication. In step S816, the portable communication terminal 200 establishes communication with the print apparatus via WLAN using the network key. Details of step S815 will be described later with reference to FIG. 14. In step S817, communication is performed by selected WLAN. In step S818, the print apparatus is caused to execute printing.

Even when the portable communication terminal and the print apparatus are connected by NFC, as in step S806, the print apparatus that has been found by the search method using WLAN is connected by WLAN, as in step S814 or S816. The communication range is wider in WLAN than in NFC. For this reason, even if the user has moved with the portable communication terminal carried with him/her after NFC communication in step S806, communication can be performed by WLAN.

As described above, the processes in steps S801 to S803 allow the user to select a print apparatus found by wireless communication such as WLAN when selecting a print apparatus and also select a print apparatus by short distance wireless communication such as NFC. The processes in steps S804 and S805 also allow the user to easily select one of two different types of communication methods.

The process in step S807 allows to automatically change the communication method so as to use WLAN if a print apparatus is specified via short distance wireless communication (first wireless communication) such as NFC, provided that a communication method (second wireless communication) having a higher speed such as WLAN exists. In addition, when switching to a communication method such as WLAN other than NFC by the processes in steps S813 and S815, even if an access key is set for the WLAN communication, the access key can be transmitted/received via NFC. As a result, the user need not separately perform an operation of obtaining the access key.

Figure 14:
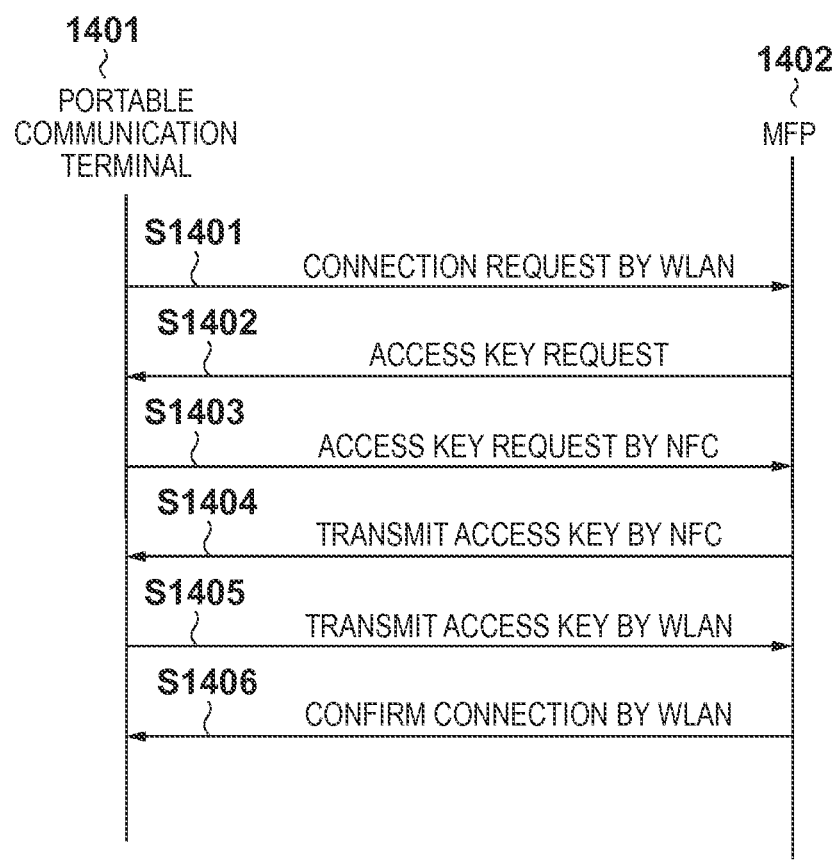
FIG. 14 is a sequence chart for explaining transmission/reception of an access key for WLAN communication.

FIG. 14 shows a sequence for explaining details of step S815. In step S1401, a portable communication terminal 1401 sends a connection request to an MFP 1402 that is a print apparatus via WLAN. In step S1402, the MFP 1402 requests an access key of the portable communication terminal 1401. In step S1403, the portable communication terminal 1401 requests the access key of the MFP 1402 by NFC (step S1403), and the MFP 1402 transmits the access key to the portable communication terminal 1401 by NFC communication (step S1404: authentication information reception).

As shown in FIG. 14, when the NFC communication is assumed to retain a high level of security, the access key that is authentication information can be transmitted/received without any problem. However, the MFP 1402 may authenticate the portable communication terminal 1401 using a communication method other than NFC communication. For example, another authentication ID may be defined in advance by NFC communication, and authentication control may be done so as to perform authentication for WLAN communication only when the authentication has normally been done. In step S1405, the portable communication terminal 1401 transmits the obtained access key to the MFP 1402, and the MFP 1402 authenticates the portable communication terminal 1401 for WLAN communication. In step S1406, the MFP 1402 establishes connection to the portable communication terminal 1401 by WLAN.

In FIG. 14, the MFP 1402 transfers the access key in response to the request from the portable communication terminal 1401. However, if the portable communication terminal 1401 knows the access key in advance, WLAN authentication may be done via NFC.

Figure 15:
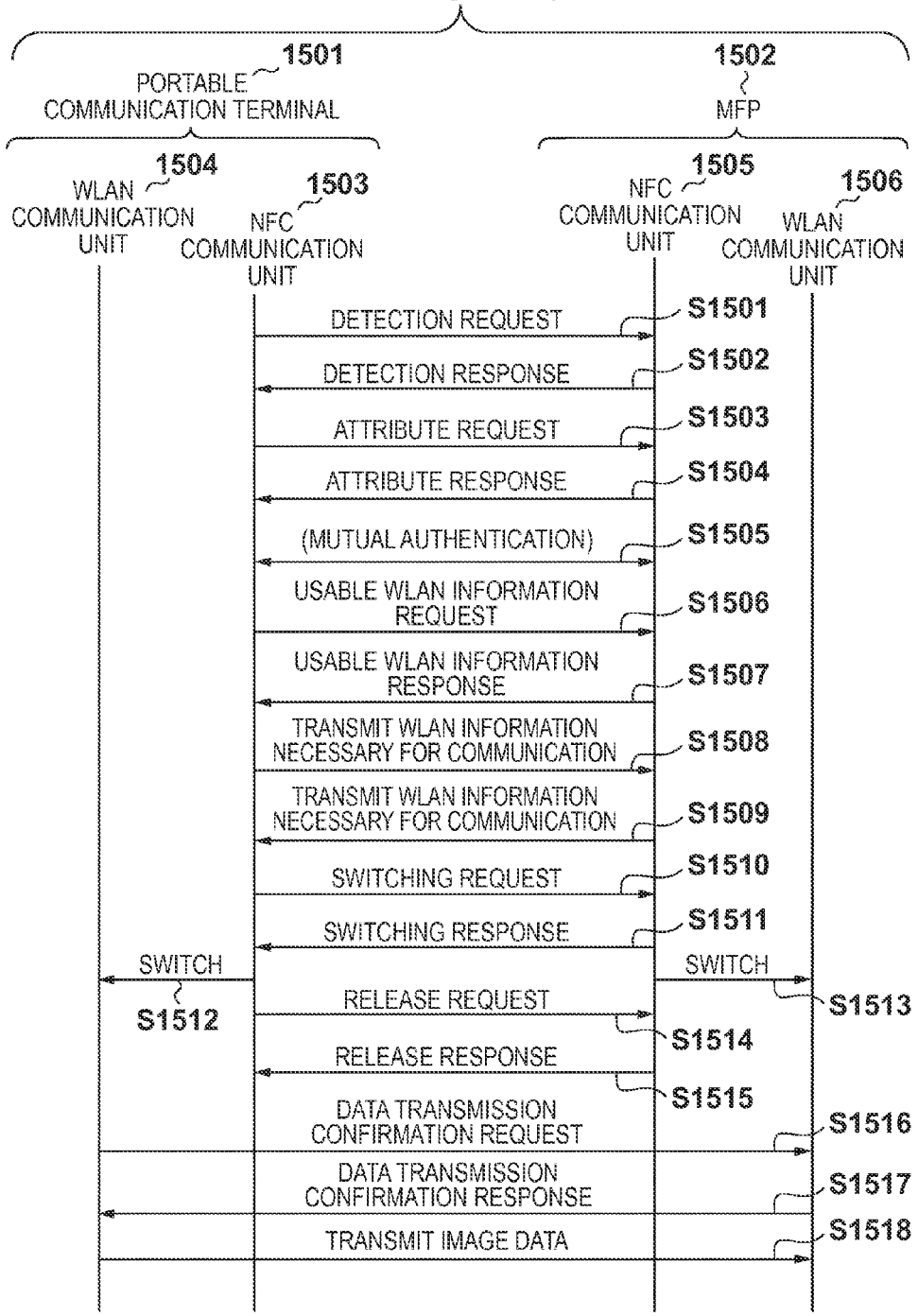
FIG. 15 is a sequence chart showing the sequence of communication switching according to the embodiment.

FIG. 15 is a sequence chart showing processing of causing a portable communication terminal 1501 to transmit a print job via NFC and then switch to WLAN communication and transfer image data so as to cause an MFP 1502 that is a print apparatus to print the image data existing on the portable communication terminal 1501. The processing on the portable communication terminal side shown in FIG. 15 is executed by, for example, the CPU 502, and the processing on the print apparatus side is executed by, for example, the CPU 602.

In step S1501, to establish NFC communication, an NFC communication unit 1503 serves as an initiator and detects an NFC communication unit 1505 as a target. When correctly detected, the NFC communication unit 1505 transmits a detection response in step S1502. Note that although FIG. 15 illustrates a case in which the portable communication terminal 1501 serves as the initiator, the print apparatus 1502 may serve as the initiator based on an input from the operation display unit 305 or the like. Upon correctly receiving the detection response, the NFC communication unit 1503 transmits an attribute request to perform NFC communication in step S1503. Upon receiving the attribute request, the NFC communication unit 1505 returns an attribute response in step S1504. In the attribute request and attribute response, the NFC-IDs of the initiator and target are transmitted, and the communication partners are specified by the IDs.

In step S1505, mutual authentication is performed so that an encryption key for data encryption and the like can be transferred. Note that the mutual authentication need not be performed if, for example, no encryption key need be transferred. In step S1506, the NFC communication unit 1503 requests information of a communication protocol usable by the print apparatus 1502 of the NFC communication unit 1505. This request includes information of a communication protocol usable by the portable communication terminal 1501. Upon receiving the request, the NFC communication unit 1505 can recognize that the WLAN communication of the portable communication terminal 1501 is usable. In step S1507, the NFC communication unit 1505 returns information of a communication protocol usable by itself in response to the request received in step S1506. This allows both apparatuses to recognize the each other's usable communication protocols.

Assume that WLAN that is a protocol other than the recognized NFC can transfer data at a speed higher than NFC, and the portable communication terminal 1501 serving as the initiator has decided to do switching to WLAN to perform communication. Note that the decision of switching may be done by the print apparatus 1502. In this case, In steps S1508 and S1509, information such as an address for specifying the partner, which is necessary for performing WLAN communication, is exchanged. After that, the process advances to step S1510, and the NFC communication unit 1503 transmits a request to switch from NFC communication to WLAN communication. Upon receiving the switching request, the NFC communication unit 1505 returns a response to the request in step S1511.

When a correct switching response is obtained, switching from the NFC communication unit 1503 to a WLAN communication unit 1504 is performed in step S1512, and switching from the NFC communication unit 1505 to a WLAN communication unit 1506 is performed in step S1513. After the switching, in step S1514, the NFC communication unit 1503 transmits a release request. Upon receiving the release request, the NFC communication unit 1505 transmits a release response in step S1515, and the NFC communication ends.

From step S1516, WLAN communication is performed based on the information for WLAN communication exchanged in steps S1508 and S1509. In step S1516, the WLAN communication unit 1504 confirms with the WLAN communication unit 1506 whether data transfer is possible. An example of the contents to be confirmed is the capacity of the free space used to temporarily save the image to be transferred to the print apparatus 1502. Upon receiving the confirmation request, the WLAN communication unit 1506 transmits a response to the request in step S1517. Upon obtaining a correct response and determining that data transfer is possible, the WLAN communication unit 1504 transmits the image data existing in the portable communication terminal 1501 to the WLAN communication unit 1506 in step S1518. This allows to transfer data of a large size using a faster communication protocol.

As described above, in this embodiment, a printer is searched for, by using both WLAN and NFC. Hence, the user can search for a desired printer without designating one of the search methods. If a printer is found by NFC, this printer is designated as a printer to be caused to execute printing. This allows a printer installed closer to the user to execute printing. In addition, if a printer found by NFC communication is found by WLAN as well, the print job is transmitted using WLAN. This allows to appropriately transmit the print job even if the distance between the portable communication terminal and the printer increases beyond the communication range of the NFC.

In the above-described embodiment, NFC has been exemplified as short distance wireless communication. However, the present invention is not limited to this, and any other communication method may be used. In addition, WLAN has been described as an example of wireless communication different from NFC. However, another wireless communication method such as Bluetooth® may be used. In this embodiment, wireless communication has been exemplified. However, the present invention is not limited to this. A printer may be searched for by a plurality of wired communications, or a printer may be searched for by wireless communication and wired communication.

In this embodiment, printing has been exemplified as the contents of predetermined processing. However, the present invention is not limited to this, and the apparatus may be caused to execute various kinds of processing.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-048620, filed Mar. 5, 2012, which is hereby incorporated by reference herein in its entirety.

What is claimed is:

1. An information processing device capable of executing a first wireless communication method and a second wireless communication method having a communication range wider than that of the first wireless communication method, comprising:
 a first communication unit configured to communicate with an apparatus by using the first wireless communication method; and
 a second communication unit configured to communicate with an apparatus by using the second wireless communication method;
 wherein, in a case where the first communication unit communicates with the apparatus and the second communication unit does not find the same apparatus as the apparatus with which the first communication unit communicates, the second communication unit transmits data to the apparatus by the second wireless communication method using information which is obtained by the first communication unit and which is for a communication according to the second wireless communication method, and
 wherein, in a case where the first communication unit communicates with an apparatus and the second communication unit finds the same apparatus, the second communication unit transmits the data to the apparatus by the second wireless communication method, without using the information.

2. The device according to claim 1, wherein in a case where the second communication unit finds a plurality of apparatuses, the second communication unit transmits the data to the same apparatus which has also communicated with the first communication unit among the plurality of apparatuses.

3. The device according to claim 1, further comprising:
 a display unit configured to display a plurality of images,
 wherein after one or more images are selected by a user from the plurality of images displayed by the display unit and the first communication unit communicates with the apparatus, the second communication unit transmits the data corresponding to the one or more images to the apparatus by the second wireless communication method.

4. The device according to claim 1, further comprising a determination unit configured to determine whether or not the second communication unit finds the same apparatus, based on first identification information obtained by the first communication unit and second identification information obtained by the second communication unit.

5. The device according to claim 4, wherein each of the first identification information and the second identification information is a MAC address of an apparatus.

6. The device according to claim 1, wherein the information is an address for specifying the apparatus.

7. The device according to claim 1, wherein the second communication unit transmits the data to a print apparatus as the apparatus and causes the print apparatus to execute printing of one or more images corresponding to the data.

8. The device according to claim 1, wherein the first wireless communication method is Near Field Communication.

9. The device according to claim 1, wherein the second wireless communication method is WLAN.

10. A control method of an information processing device capable of executing a first wireless communication method and a second wireless communication method having a communication range wider than that of the first wireless communication method, the method comprising:
 a first transmitting step of, in a case where the information processing device communicates with an apparatus by the first wireless communication method and does not find, by the second wireless communication method, the same apparatus as the apparatus with which the information processing device communicates by the first wireless communication, transmitting data the apparatus by the second wireless communication method using information which is obtained by the first wireless communication method and which is for a communication according to the second wireless communication method; and
 a second transmitting step of, in a case where the information processing device communicates with an apparatus by the first wireless communication method and finds the same apparatus by the second wireless communication method, transmitting the data to the apparatus by the second wireless communication method, without using the information.

11. The method according to claim 10, wherein in a case where a plurality of apparatuses are found using the second wireless communication method, the data is transmitted to the same apparatus which has also communicated with the information processing device by the first wireless communication method among the plurality of apparatuses.

12. The method according to claim 10, further comprising:
 a displaying step of displaying a plurality of images,
 wherein after one or more images are selected by a user from the plurality of displayed images, the information processing device transmits the data corresponding to the one or more images to the apparatus by the second wireless communication method.

13. The method according to claim 10, further comprising a determination step of determining whether or not the second communication unit finds the same apparatus, based on first identification information obtained by the first wireless communication method and second identification information obtained by the second wireless communication method.

14. The method according to claim 13, wherein each of the first information and the second information is a MAC address of an apparatus.

15. The method according to claim 10, wherein the information is an address for specifying the apparatus.

16. The method according to claim 10, wherein the first transmitting step and the second transmitting step transmit the data to a print apparatus as the apparatus and cause the print apparatus to execute printing of one or more images corresponding to the data.

17. The method according to claim 10, wherein the first wireless communication method is Near Field Communication.

18. The method according to claim 10, wherein the second wireless communication method is WLAN.

19. A non-transitory computer-readable storage medium storing a program that causes a computer to execute:
   a first transmitting step of, in a case where the computer communicates with an apparatus by a first wireless communication method and does not find, by the second wireless communication method, the same apparatus as the apparatus with which the information processing device communicates by the first wireless communication, transmitting data to the apparatus by a second wireless communication method having a communication range wider than that of the first wireless communication method, using information which is obtained by the first wireless communication method and which is for a communication according to the second wireless communication method; and
   a second transmitting step of, in a case where the computer communicates with an apparatus by the first wireless communication method and finds the same apparatus by the second wireless communication method, transmitting the data to the apparatus by the second wireless communication method, without using the information.

20. A control method of a mobile device capable of executing Near Field Communication and WLAN, the method comprising:
   a first transmitting step of, in a case where the mobile device communicates with a printer by the Near Field Communication and does not find, by the WLAN, the same printer as the printer with which the mobile device communicates by the Near Field Communication, transmitting data to the printer by the WLAN using information which is obtained by the Near Field Communication and which is for a communication according to the WLAN; and
   a second transmitting step of, in a case where the mobile device communicates with a printer by the Near Field Communication finds the same printer by the WLAN, transmitting the data to the printer by the WLAN, without using the information.

21. The method according to claim 20, wherein in a case where a plurality of printers are found using the WLAN, the data is transmitted to a the same printer which has also communicated with the mobile device by the Near Field Communication among the plurality of printers.

22. The method according to claim 20, further comprising:
   a displaying step of displaying a plurality of images,
   wherein after one or more images are selected by a user from the plurality of displayed images, the mobile device transmits the data corresponding to the one or more images to the printer by the WLAN.

23. The method according to claim 20, further comprising a determination step of determining whether or not the second communication unit finds the same apparatus, based on first identification information obtained by the Near Field Communication and second identification information obtained by the WLAN.

24. The method according to claim 23, wherein each of the first information and the second information is a MAC address of a printer.

25. The method according to claim 20, wherein the information is an address for specifying the printer.

26. The method according to claim 20, wherein the mobile device is a smart phone.

27. A mobile device capable of executing Near Field Communication and WLAN, comprising:
   a NFC unit configured to communicate with a printer by using the Near Field Communication; and
   a WLAN unit configured to communicate with the printer by using the WLAN,
   wherein, in a case where the NFC unit communicates with a printer and the WLAN unit does not find the same printer as the apparatus with which the NFC unit communicates, the WLAN unit transmits the data to the printer by the WLAN using information which is obtained by the NFC unit and which is for a communication according to the WLAN, and
   wherein, in a case where the NFC unit communicates with a printer and the WLAN unit finds the same printer, the WLAN unit transmits the data to the printer by the WLAN, without using the information.

28. The device according to claim 3, wherein the display unit further displays information representing an apparatus found by the second communication unit,
   wherein in a case where the user has designated the apparatus represented by the information displayed by the display unit, the second communication unit transmits the data to the apparatus represented by the information displayed by the display unit.

29. The method according to claim 12, further comprising a second display step of displaying information representing an apparatus found by the second wireless communication method,
   wherein in a case where the user has designated the apparatus represented by the information displayed in the second display step, the second transmitting step transmits the data to the apparatus represented by the information displayed in the second display step.

30. The method according to claim 22, further comprising a second display step of displaying information representing a printer found by the WLAN,
   wherein in a case where the user has designated the printer represented by the information displayed in the second display step, the second transmitting step transmits the data to the printer represented by the information displayed in the second display step.

* * * * *